Feb. 14, 1933.  T. R. HERBEST, JR  1,897,842
METALLIC LATHING
Filed May 31, 1930
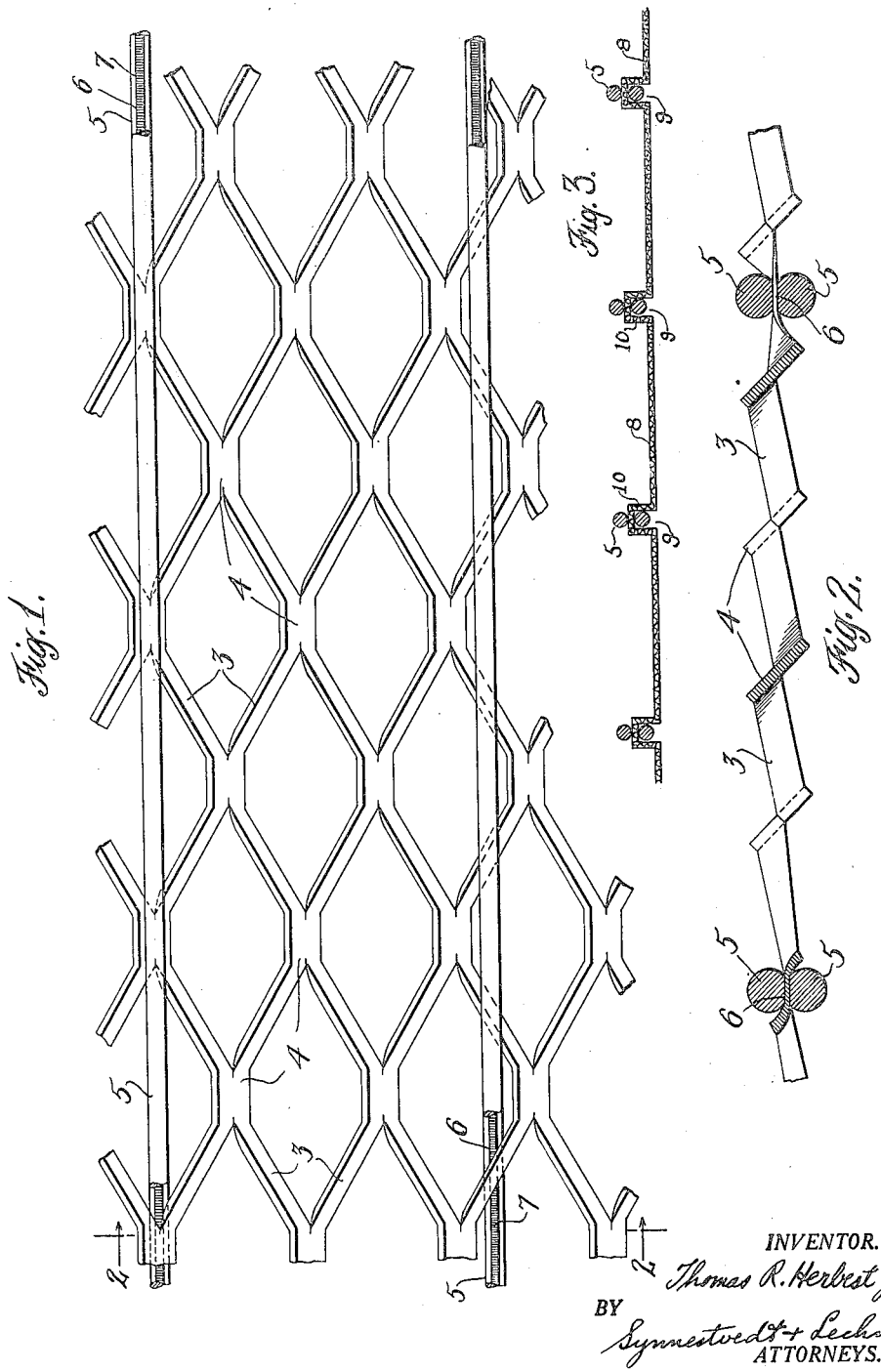
INVENTOR.
Thomas R. Herbest Jr.
BY
Synnestvedt + Lechner
ATTORNEYS.

Patented Feb. 14, 1933

1,897,842

UNITED STATES PATENT OFFICE

THOMAS R. HERBEST, JR., OF WHEELING, WEST VIRGINIA, ASSIGNOR TO THE CONSOLIDATED EXPANDED METAL COMPANIES, OF WHEELING, WEST VIRGINIA, A CORPORATION OF WEST VIRGINIA

METALLIC LATHING

Application filed May 31, 1930. Serial No. 458,605.

This invention relates to metallic lathing and is more particularly concerned with the type of lathing which embodies or includes metallic meshwork provided with strengthening means in the form of rib-like elements.

The present application is in the nature of a substitute for and a continuation in part of my application Serial No. 197,860, filed June 10, 1927.

One of the important general objects of the invention is the provision of lathing of the type referred to above in which the strengthening means or ribs afford more effective reinforcement or provide a greater degree of rigidity than has been possible heretofore in the manufacture of lathing of any given thickness or quality of material. Embodying the strengthening members of the present invention in a lath of a given weight, therefore, results in a product which has greater strength and rigidity than other forms. The lath or lathing, consequently, is better adapted for reinforcement of plastic materials such as plaster or cement.

The lathing, furthermore, is relatively inexpensive to manufacture and, at the same time, may be produced continuously and at a high rate of speed.

The foregoing objects and advantages, as well as others which will occur to those skilled in the art will be more apparent from a consideration of the following description, taken with the accompanying drawing which illustrates the preferred embodiment of the lath and in which Figure 1 is a plan view of a portion of a sheet of lathing embodying the improvements of this invention, certain parts thereof being broken away in order to illustrate the structure more clearly;

Figure 2 is a sectional view taken substantially as indicated by the line 2—2 on Figure 1; and Figure 3 is a somewhat diagrammatic view of a modified form of lath.

By more particular reference to the drawing, especially Figures 1 and 2, it will be seen that the lath includes meshwork or reticulated metal, the particular embodiment illustrated being in the nature of expanded metal comprising strands 3 and connecting bridges 4.

The strengthening means of the present invention takes the form of rib-like elements, each of which is composed of a pair of elongated members 5 which are arranged at opposite faces of the meshwork preferably in parallelism. The members 5, furthermore, are preferably flattened at their adjacent surfaces as indicated at 6, and the flattened surfaces are welded to each other thru the meshwork so that the latter is rigidly gripped or secured between each pair of members 5. The welding is preferably of the "spot" type although if desired it may be performed in such manner as to unite the wires or elongated members 5 to each other throughout their entire length.

In addition to the foregoing the flattened surfaces 5 of the members 6 are preferably roughened or knurled as indicated at 7 in Figure 1 in order to provide a multiplicity of small points of contact and, therefore, of welding between the members 5 of each pair. The flattening and roughening of the strengthening members results in increased strength and rigidity of the entire lathing, particularly as against strains or forces applied transversely of the meshwork.

A method and apparatus suitable for manufacturing the lathing of the present invention is disclosed in my copending application Serial No. 444,173, filed April 14, 1930.

In connection with the welding of the strengthening members to the lath, it might be noted that the strengthening members, preferably take the form of wires which are continuously fed from reels or spools in order that continuous operation or manufacture of the lath may be realized. The wires, furthermore, may be arranged in any suitable manner but in the preferred embodiment illustrated in the drawing the wires or strengthening members 5 are arranged in parallelism and in pairs extending longitudinally of the sheets of meshwork. Any suitable number of pairs may be provided transversely of the sheets and, it might be noted that the wires of each pair need not be positioned at any particular point with respect to the strands or connecting bridges of the meshwork. In the drawing, it will be seen that one pair of wires is shown as overlying or crossing a row or series of bridges of the meshwork while another pair overlies or falls on a series of connecting strands. Still further, with the preferred type of welding (spot welding) the feed of the material thru the welding apparatus need not be timed in any particular relation to the frequency or points at which the welds occur. Indeed, certain of the welds might occur on or partially on the crossing points of the strengthening members and the strands or bridges of the meshwork. In this case the strengthening wires are welded to the interposed portion of the meshwork.

It is to be understood, however, that a large proportion of the welds will occur at points, longitudinally of the wires, which fall within openings of the meshwork and that the welding of wire to wire in this manner is the primary bond relied upon in securing the strengthening members or ribs to the meshwork, although the points at which the wires are directly welded to the meshwork also increases the strength of the entire structure.

It is also to be understood that the flattening and roughening of the strengthening wires is advantageous in reducing to a minimum any shearing or burning action which may be incident to the welding operation.

Referring to the showing of Figure 3, attention is called to the fact that the meshwork, diagrammatically indicated at 8, is provided with elongated recesses 9 provided by grooving the meshwork as indicated at 10. The strengthening members 5, in this case are positioned at the grooved portions 10 of the meshwork and thus provide very rigid and substantial reinforcement.

The present invention, therefore, contemplates a lath which, in effect, is provided with rigid and substantial ribs or strengthening members extending longitudinally of the sheet and projecting laterally at each face thereof. The product, as a result, is very rigid for a given weight or gauge material. Conversely, lathing of a given strength or rigidity may be manufactured from stock of finer gauge than has been used heretofore.

I claim:—

1. As a new article of manufacture, expanded metal having a pair of ribs in the form of wire welded through the meshwork of the metal, the ribs of the pair being arranged on opposite faces of the meshwork and parallel to each other.

2. As a new article of manufacture, expanded metal having a pair of ribs in the form of flattened wire welded to each other through the meshwork of the metal on opposite faces thereof.

3. As a new article of manufacture, expanded metal having a pair of ribs in the form of flattened wire welded to each other through the meshwork of the metal on opposite faces thereof, the wire ribs being arranged parallel to each other with flattened surfaces juxtaposed.

4. As an article of manufacture, lathing including metallic meshwork and strengthening means therefor in the form of a pair of elongated members each having a flattened side, the members being arranged at opposite faces of the meshwork with their flattened sides welded to each other through the meshwork openings.

5. As an article of manufacture, lathing including metallic meshwork and strengthening means therefor in the form of a pair of elongated members each having a flattened and roughened surface, the members being arranged at opposite faces of the meshwork with their flattened and roughened surfaces welded to each other through the meshwork.

6. As an article of manufacture, lathing including metallic meshwork and strengthening means therefor in the form of a pair of elongated members each having a flattened side, the members being arranged in parallelism at opposite faces of the meshwork with their flattened sides welded to each other through the meshwork.

7. As an article of manufacture, lathing including metallic meshwork and strengthening means therefor in the form of a pair of elongated members each having a flattened side, the members being arranged in parallelism at opposite faces of the meshwork with their flattened sides welded to each other through the meshwork at a plurality of spaced points.

8. As an article of manufacture, lathing including expanded metal meshwork and strengthening means therefor in the form of a pair of elongated members each having a flattened surface, the members being arranged in parallelism at opposite faces of the meshwork with their flattened surfaces welded to each other through the meshwork.

9. Lathing including expanded metal meshwork and strengthening ribs secured thereto, each rib being in the form of a pair of wires arranged in parallelism at opposite faces of the meshwork and having flattened surfaces welded to each other through the meshwork.

10. Lathing including expanded metal meshwork and strengthening ribs secured thereto, each rib being in the form of a pair of wires arranged in parallelism at opposite faces of the meshwork and having flattened and knurled surfaces welded to each other through the meshwork.

11. As a new article of manufacture, expanded metal having a pair of ribs in the form of wire welded to the meshwork of the metal at a plurality of points longitudinally of the ribs, the said ribs being arranged in parallelism on opposite faces of the meshwork.

12. As a new article of manufacture, expanded metal having a pair of ribs in the form of wire welded to the meshwork of the metal at a plurality of points longitudinally of the ribs, the said ribs being arranged on opposite faces of the meshwork in juxtaposition to each other, and the points of welding of one rib being arranged at the opposite face of the portions of the meshwork at which the points of welding of the other rib fall.

13. As a new article of manufacture, expanded metal having a groove in the meshwork thereof with a pair of strengthening members in the form of wire welded to each other through the grooved portion at opposite sides thereof, the wires being arranged in parallelism.

14. As a new article of manufacture, lathing including metallic meshwork and strengthening means for the meshwork including a pair of wires arranged in parallelism at opposite faces of the meshwork, the wires having knurled surfaces welded to each other through meshwork openings.

15. As a new article of manufacture, lathing including metallic meshwork and strengthening means for the meshwork including a pair of wires arranged in parallelism at opposite faces of the meshwork, the wires having knurled surfaces disposed adjacent to each other and welded to the meshwork.

16. As a new article of manufacture, lathing including metallic meshwork having a groove therein, and strengthening means for the meshwork including a plurality of elongated strengthening members arranged at opposite sides of the meshwork, there being an elongated strengthening member lying in said groove and an elongated strengthening member at the opposite side of the meshwork welded to the member in said groove through a meshwork opening.

17. As an article of manufacture, lathing including metallic meshwork and strengthening means therefor in the form of a pair of elongated strengthening members arranged in parallel relationship with respect to each other at opposite faces of the meshwork, the strengthening members of said pair being welded to each other through meshwork openings.

In testimony whereof I have hereunto signed my name.

THOMAS R. HERBEST, Jr.